United States Patent [19]
Fisher et al.

[11] Patent Number: 6,103,001
[45] Date of Patent: *Aug. 15, 2000

[54] STABLE, CONSTANT PARTICLE SIZE, AQUEOUS EMULSIONS OF NONPOLAR SILANES SUITABLE FOR USE IN WATER REPELLENCE APPLICATIONS

[75] Inventors: Paul David Fisher; Ronald Paul Gee, both of Midland, Mich.

[73] Assignee: Dow Corning Corporation, Midland, Mich.

[ * ] Notice: This patent is subject to a terminal disclaimer.

[21] Appl. No.: 09/323,325

[22] Filed: Jun. 1, 1999

Related U.S. Application Data

[63] Continuation-in-part of application No. 09/209,521, Dec. 10, 1998, Pat. No. 6,074,470.

[51] Int. Cl.⁷ .................................................. C09D 183/16
[52] U.S. Cl. ............................. 106/287.14; 106/287.15; 106/287.16; 106/2
[58] Field of Search ........................ 106/287.14, 287.15, 106/287.16, 2

[56] References Cited

U.S. PATENT DOCUMENTS

| | | | |
|---|---|---|---|
| Re. 33,759 | 12/1991 | DePasquale et al. | 106/2 |
| 3,772,065 | 11/1973 | Seiler | 117/123 C |
| 4,648,904 | 3/1987 | DePasquale et al. | 106/2 |
| 4,877,654 | 10/1989 | Wilson | 427/387 |
| 4,889,747 | 12/1989 | Wilson | 427/221 |
| 4,937,104 | 6/1990 | Puhringer | 427/344 |
| 4,990,377 | 2/1991 | Wilson | 427/387 |
| 5,226,954 | 7/1993 | Suzuki | 106/2 |
| 5,314,533 | 5/1994 | Goebel et al. | 106/287.13 |
| 5,458,923 | 10/1995 | Goebel et al. | 427/387 |
| 5,746,810 | 5/1998 | Suzuki | 106/2 |

FOREIGN PATENT DOCUMENTS

| | | | |
|---|---|---|---|
| 0 075 962 A1 | 9/1982 | European Pat. Off. | C08L 83/06 |
| 2 301 102 | 11/1996 | United Kingdom | C04B 41/49 |

*Primary Examiner*—David Brunsman
*Attorney, Agent, or Firm*—James L. DeCesare

[57] ABSTRACT

This invention relates to a stable aqueous silane emulsion with constant particle size. The emulsion comprises a continuous water phase, a discontinuous silane phase, and an emulsifier system. The emulsifier system contains a primary surfactant and a cosurfactant. The primary surfactant functions to prevent coalescence of particles, by steric or ionic repulsion between particles. The cosurfactant prevents diffusion of the silane into the aqueous phase. The combination of primary surfactant and cosurfactant results in an adsorbed inner layer of cosurfactant between the silane and the outer layer of a mixture of both surfactants which contacts the water phase. The combination of primary surfactant and cosurfactant provides a barrier which prevents diffusion of silane into the water phase. A method for preparing the emulsion is also disclosed.

33 Claims, No Drawings

STABLE, CONSTANT PARTICLE SIZE, AQUEOUS EMULSIONS OF NONPOLAR SILANES SUITABLE FOR USE IN WATER REPELLENCE APPLICATIONS

This is a continuation in part of U.S. Ser. No. 09/209,521 filed Dec. 10, 1998, now U.S. Pat. No. 6,074,470.

FIELD OF THE INVENTION

This invention relates to aqueous silane emulsions that can be used in water repellence applications. More particularly, this invention relates to aqueous silane emulsions that do not phase separate with age and that have an average particle size that does not increase significantly with age.

BACKGROUND OF THE INVENTION

Organosilane and organosilicone compounds dissolved in organic solvents have been used to render masonry and other substrates water repellent in the past. For example, U.S. Pat. No. 3,772,065 to Seiler discloses a method for waterproofing masonry structures. The method comprises impregnating masonry structures with an alcoholic or hydrocarbon solution of hydrolyzed alkyltrialkoxysilanes and their lower oligomers. European Patent 0 075 962 to Pühringer discloses an impregnating agent for porous building materials containing tetraalkoxysilanes, alkyltrialkoxysilanes, or aryltrialkoxysilanes, a surfactant, an aliphatic solvent, and an optional condensation reaction catalyst. U.S. Pat. No. 4,937,104 to Pühringer discloses a process for imparting hydrophobicity to mineral substrates. The process comprises mixing at least one silane, a hydrolysis product of the silane, a condensation product, or combinations thereof, with a surfactant and a water/organic alcohol mixture. The resulting emulsion is applied to a mineral substrate. However, organic solvents such as alcohols and hydrocarbons are flammable, expensive, and have detrimental environmental and physiological effects.

U.S. Pat. No. RE 33,759 to DePasquale et al. discloses an aqueous emulsion containing silanes for rendering masonry surfaces water repellent. The system consists essentially of a hydrolyzable silane, and oligomers thereof; a surfactant having hydrophilic-lipophilic balance (HLB) of 4 to 15; and water. The hydrolyzable silane has the formula $R_nSiR'_{(4-n)}$ where n is 1 or 2, R is independently selected from hydrocarbon and halogenated hydrocarbon groups of 1 to 20 carbon atoms, and R' is selected from alkoxy groups of 1 to 3 carbon atoms, halide groups, amino groups, and carboxyl groups. The surfactant can be nonionic, amphoteric, ionic, or combinations thereof. The preferred surfactants are SPAN® surfactants, which have HLB values in the range of 4.3 to 8.6, and TWEEN® 61 and TWEEN® 81, which have HLB values of 9.6 and 10.0, respectively. However, pH and particle size of the emulsion are not disclosed. Particle size change with time is not disclosed.

U.S. Pat. Nos. 4,877,654 and 4,990,377, both to Wilson et al., disclose aqueous emulsions for rendering porous substrates water repellent. The emulsion comprises a hydrolyzable silane, an emulsifier with HLB of 1.5 to 20, a buffer, and water. The silane has formula $R_nSiR'_{4-n}$, where R is independently selected from hydrocarbon- and halogenated hydrocarbon groups of 1 to 30 carbon atoms; n is 1 or 2, and R' is an alkoxy group of 1 to 6 carbon atoms, a halide group, an amino group, or a carboxyl group. Nonionic, cationic, anionic, and amphoteric emulsifiers are suitable. The emulsion has a pH of 6–8. However, stability and particle size of the emulsion are not disclosed. Particle size change with time of the emulsion is not disclosed.

U.S. Pat. No. 5,226,954 to Suzuki, discloses an organosilicon composition comprising a monoalkyltrialkoxysilane and/or a condensate thereof, an emulsifier mixture of an anionic emulsifier and a nonionic emulsifier, and water. The composition undergoes emulsification to form an emulsion. 'Emulsification' as defined therein is achieved when the alkylalkoxysilane and the emulsifier are mixed and form an upper layer that is opaque and further where a small amount of water separates to form a lower layer that is more transparent than the upper layer. Suzuki '954 does not disclose particle size of the emulsion. Suzuki '954 does not disclose particle size increase over time.

U.S. Pat. No. 5,746,810 to Suzuki discloses an aqueous emulsion of an alkylalkoxysilane, a surfactant, and water. Suzuki '810 discloses that the emulsion is stable and has particle diameter in the range of 2 to 10 micrometers. Suzuki '810 defines 'stable' to mean that after storage, some separation into an opaque layer of silane concentrated emulsion and a colorless transparent layer of water is acceptable when the material can easily be reemulsified. The emulsion has a pH of 7.5–9.

United Kingdom Publication GB 2 301 102 A to Toagosei Co., Ltd., discloses an aqueous emulsion prepared by hydrolyzing a silane selected from the group consisting of alkoxysilanes and alkylhalogensilanes by heating in the presence of an acid catalyst and a small amount of water to form a mixture of the silane and its oligomer, and subsequently emulsifying the mixture with water and an emulsifier. The alkoxysilane has the formula $R_nSiR'_{4-n}$, where R is independently selected from alkyl groups, substituted alkyl groups, and aryl groups; n is 1 or 2, and R' is an alkoxy group of 1 to 6 carbon atoms. The emulsifier can be nonionic, anionic, or cationic. The particle size of the emulsion is 1 micrometer or smaller. Emulsions prepared according to Toagosei with particle size larger than 1 micrometer tend to be unstable and liable to phase separation.

U.S. Pat. No. 5,458,923 and U.S. Pat. No. 5,314,533, both to Goebel et al., disclose aqueous emulsions of organosilicon compounds. The emulsion comprise an alkoxysilane, an ionic surfactant, an organosilicon surfactant, and water. The emulsion is stable for weeks at pH 6 to 9. 'Stable' is defined as 1. an emulsion having no phase separation and no formation of a layer of cream, or 2. if formation of a layer of cream does occur, the emulsion can be obtained by simple stirring with no loss of effects.

However, none of these patents address the problem of particle size increase with time. This is generally due to a process known as Ostwald Ripening in which the low molecular weight emulsified silane compound has a sufficient solubility in water such that it diffuses from smaller particles through the aqueous phase into larger particles. This results in a net increase in average particle size of the emulsion with time. This can lead to inconsistent behavior or performance of the emulsion in commercial use due to changing properties of the emulsion with age.

Additionally, when an alkoxysilane is used as the silane compound in the emulsion, over time the alkoxysilane can react when it contacts the water phase. The alkoxysilane can undergo hydrolysis and condensation, thereby forming a siloxane and liberating alcohol, which can break the emulsion.

Therefore, an object of this invention is to provide a means to prevent, or minimize, increasing particle size with age; thereby providing the capability to produce stable emulsions of low molecular weight silanes. "Low molecular weight" means a molecular weight (MW) less than 1000.

Particles of increasing size will cream up more rapidly, in accordance with Stokes Law for the rate of creaming of particles in an emulsion. Conversely, if the particles are sufficiently small, the velocity of random particle movement due to Brownian Motion will be sufficient to prevent creaming. The use of additives in the silane compound phase or water phase to decrease the density difference between the silane compound and water to near zero is one technique to minimize creaming. However, this is often undesirable, as it adds to the manufacturing cost of an emulsion and may have detrimental effects on the use of the emulsion in some applications. To reduce creaming, one may also increase the viscosity of the aqueous phase with thickeners such as alginates, as disclosed in U.S. Pat. No. 5,746,810, or with the use of large amounts of emulsifiers relative to the amount of interfacial surface area between the oil particles and the water phase. The use of such large amounts of emulsifier results in the formation of emulsifier structures such as liquid crystals on the particle surface and in the water phase which produces a viscous aqueous phase. Use of excessive amounts of emulsifiers is generally detrimental to the water repellency properties provided by silane emulsions.

Therefore, it is a further object of this invention to produce emulsions of silanes having sufficiently small particle size such that they do not exhibit significant creaming and remain essentially stable in silane concentration with age. To this end it is an object of this invention to provide emulsions having average particle size less than 10 micrometers.

An emulsion will not change in uniformity due to creaming if the emulsion is so concentrated in dispersed oil particles that it is already a cream from top to bottom of the container. The maximum packing of rigid spheres of the same diameter is 74% by volume. Accordingly in theory, as the concentration of silane phase in a polydisperse particle size emulsion approaches or exceeds this concentration, the emulsion becomes quite viscous and unlikely to exhibit non-uniformity due to creaming, as it is already essentially in a creamed state. Due to the viscous, paste-like nature of such emulsions, they are difficult to pump or handle in commercial use.

Therefore, it is a further object of this invention to provide stable silane emulsions with constant particle size that also have low viscosity for ease of handling. The emulsions of this invention have silane concentrations of approximately 65% or less by weight and are easily handled such as by pouring or pumping due to their low viscosity.

SUMMARY OF THE INVENTION

This invention relates to an aqueous silane emulsion and a method for its preparation. The emulsion comprises an alkoxysilane, an emulsifier system consisting essentially of at least two emulsifiers, and water. One emulsifier is the primary emulsifier, and it is a nonionic surfactant with HLB greater than 13. The second emulsifier is a nonionic cosurfactant, and it has an HLB value of less than 11. The emulsion has improved stability in that the emulsion of alkoxysilanes exhibits no phase separation with age. The emulsion has uniformity in that the discontinuous phase exhibits no, or minimal, increase in particle size with age.

DETAILED DESCRIPTION OF THE INVENTION

The aqueous silane emulsions of the present invention are stable and have constant particle size. "Stable" means that the emulsion does not phase separate into a water layer and a silane (oil) layer with age. "Constant" means that the particle size of the emulsion does not increase significantly with age. Preferably, particle size does not increase by more than 10% after the emulsion is stored at about 25° C. for at least 14 days. These emulsions are easily handled such as by pouring or pumping due to their low viscosity. Typically, viscosity of the emulsion is not greater than about 5 sq mm/s. However, at silane concentrations greater than 50%, emulsion viscosity will be greater than 5, and may be as high as 1,000 sq mm/s. Emulsions with viscosity in the range of 5 to 1,000 sq mm/s are easily poured and pumped.

This invention relates to an aqueous silane emulsion comprising:
  A) a continuous phase comprising water;
  B) a discontinuous phase comprising at least 1 nonpolar silane, wherein the discontinuous phase forms particles dispersed in the continuous phase; and
  C) an emulsifier system consisting essentially of
    (i) a primary surfactant, and
    (ii) a cosurfactant.

This emulsion has the advantage that even a low molecular weight silane can be emulsified to form a stable emulsion with constant particle size. However, it is not meant that this invention is limited to low molecular weight nonpolar silanes. This emulsion can contain nonpolar silanes having molecular weights greater than 1,000. 'Nonpolar silane' means that at least one nonpolar organofunctional group is bonded to the silicon atom.

The nonpolar silane is preferably a nonpolar alkoxysilane. Typically, the amount of nonpolar alkoxysilane is 1 to 65 wt % of the emulsion. When the emulsion will be used in water repellence applications, the amount of nonpolar alkoxysilane is preferably from 10 to 60 wt %. However, more dilute emulsions (i.e., where the amount of nonpolar silane is from 5 to 10 wt %) are suitable for some applications.

Suitable nonpolar alkoxysilanes have the general formula $R_nSiR'_{4-n}$, where each R is independently selected from the group consisting of alkyl, halogenated alkyl, aryl, and substituted aryl groups, R' is an alkoxy group of 1 to 10 carbon atoms, and n is 1 or 2. R is preferably independently selected from the group consisting of alkyl and aryl groups, and R' is preferably an alkoxy group of 1 to 5 carbon atoms. However, when the emulsion will be used in water repellence applications, preferably R is independently an alkyl group of 8 to 20 carbon atoms and R' has 1 to 6 carbon atoms. However, alkyl groups R having 1 to 7 carbon atoms are also suitable for use in this emulsion.

Suitable alkylalkoxysilanes and halogenated alkylalkoxysilanes for component (B) are disclosed by U.S. Pat. No. RE 33,759 to DePasquale et al., which is hereby incorporated by reference for the purpose of disclosing suitable alkoxysilanes. Preferably, the alkylalkoxysilane is selected from the group consisting of isobutyltriethoxysilane, isobutyltrimethoxysilane, n-octyltriethoxysilane, and n-octyltrimethoxysilane. When the emulsion will be used in water repellence applications, the alkylalkoxysilane is preferably n-octyltriethoxysilane. Suitable halogenated alkylalkoxysilanes include 3,3,3-trifluropropyl trimethoxysilane and 6,6,6-trifluorohexyl trimethoxysilane.

However, this emulsion is advantageous over the emulsion disclosed by DePasquale et al. because high purity silanes can be emulsified to form stable emulsions having constant particle size. The high purity silanes typically contain about 5 wt % or less of impurities. Furthermore, silanes having impurity contents as low as 2.50 wt % or less, 0.63 wt % or less, and even 0.1 wt % or less can also be used to form an emulsion according to this invention. "Impurity" means any dimer, trimer, or oligomer of the silane; and includes any other siloxane polymer or high molecular weight oil present in the silane.

The emulsion of this invention can be produced with a particle size less than 10 micrometers. Preferably, particle size is less than 1 micrometer, and more preferably, particle size is less than 0.5 micrometers.

The emulsifier system inhibits particle size increase with age. The emulsifier system comprises a primary surfactant and a cosurfactant. The primary surfactant prevents coalescence of the particles by steric repulsion between particles. The cosurfactant prevents diffusion of the silane out of the particle, which could result in Ostwald Ripening.

The amounts of each surfactant in the emulsifier system are sufficient to provide an outer mixed monolayer that contacts the water phase and a second inner monolayer of essentially water insoluble cosurfactant. The mixed monolayer is a combination of both surfactants. This surfactant bilayer provides a significant barrier to retard or prevent diffusion of the silane out of the particle. The emulsifier system imparts stability and constant particle size to the emulsion.

The primary surfactant is a nonionic surfactant having an HLB greater than about 13.0, preferably greater than 15.0. The concentration of primary surfactant in the emulsion is 0.5 to 3 molecules per 100 square Angstroms of surface area of the silane particles. However, for very dilute emulsions and with relatively large particle size where the concentration of primary surfactant becomes low by these constraints, it may be necessary to increase this amount by the critical micelle concentration (CMC) of the emulsifier to adjust for the amount that would be dissolved in the water phase.

Suitable nonionic primary surfactants are typically selected from the group consisting of ethoxylated octylphenols, ethoxylated fatty esters and oils, ethoxylated alcohols, and combinations thereof. Examples of suitable nonionic primary surfactants are as follows, with the HLB value in parentheses after the name of the surfactant.

Suitable nonionic primary surfactants having HLB greater than 13.0 are commercially available. For example surfactants that are solids at room temperature can be used, and they are exemplified by BRIJ® 700 (18.8), which is a polyoxyethylene stearyl ether available from ICI Americas Inc. of Wilmington, Del.; MAPEG® S-40K (17.2), which is a polyoxyethylene monostearate available from PPG/Mazer of Gurnee Ill.; MACOL® SA-40 (17.4), which is a steareth-40 available from PPG/Mazer of Gurnee Ill.; MACOL® SA-20 (15.4) which is a steareth-20 available from PPG/Mazer of Gurnee Ill.; and TERGITOL® 15-S-20 (16.3) which is a secondary alcohol ethoxylate having 11 to 15 carbon atoms available from Union Carbide Chem. & Plastics Co., Industrial Chemicals Division, Danbury Conn.

Other suitable nonionic surfactants for the primary surfactant include TERGITOL® 15-S-40 (18.0), an ethoxylated alcohol available from Union Carbide Corporation; HETSORB® O-20 (15.0), a sorbitan laureate available from Heterene Chemical; TWEEN® 80 (15.0), a polyoxyethylene sorbitan monooleate available from ICI Americas Inc. of Wilmington Del.; APG 325 CS® Glycoside (13.0), a 9 to 11 carbon alkyl polysaccharide ether having available from Henkel Corporation Ambler, Pa.; BRIJ® 35L (16.9), which is polyoxyethylene lauryl ether produced by ICI Surfactant and TRITON® X-100 (13.5), TRITON® X-305 (17.3), and TRITON® X-705 (17.9), all of which are ethoxylated octylphenols produced by Union Carbide Corporation. BRIJ® 35L is preferred.

The cosurfactant must have an HLB less than 11. Examples of some suitable cosurfactants and their HLB values include: ALDO® MS (3.8–3.9), which is glycerol monostearate, and LONZEST® GMO (3.0), which is an ethoxylated fatty ester, both of which are produced by Lonza Inc., Fairlawn, N.J.; S-MAZ® 60K (4.7), which is a sorbitan monostearate available from PPG Industries, Gurnee, Ill.; ARLACEL® 60 (4.7), which is a sorbitan stearate available from ICI Americas Inc., Wilmington, Del.; oleates such as sorbitan monooleate (4.3), sorbitan trioleate (1.8), polyoxyethylene sorbitan monooleate (10.0); ALDO PGHMS® (3.0), which is propylene glycol monostearate available from Lonza Inc., Fairlawn, N.J.; MAPEG® EGMS (2.9), which is ethylene glycol monostearate available from PPG/Mazer Gurnee, Ill.; HODAG® DGS (4.7), which is diethylene glycol monostearate; ETHOX® SAM-2 (4.9), which is a polyoxyethylene stearyl amine available from Ethox Chemicals Inc., Greenville, S.C.; MACOL® SA-2 (4.9), which is a polyoxyethylene stearyl ester available from PPG/MAZER, Gurnee, Ill.; and polyoxyethylene ethers such as BRIJ® 72 (4.9), which is a polyoxyethylene lauryl ether and BRIJ® 52 (4.9), which is a polyoxyethylene cetyl ether, both of which are available from ICI Americas Inc.; SPAN® 20 (8.6), which is a sorbitan monolaurate available from ICI Surfactants; and CALGENE® GML (3.0), which is glycerol monolaurate available from Calgene Chemical, Inc.

Sorbitan fatty acid esters having HLB values in the range of 4.3 to 8.6 and polyoxyethylene sorbitan fatty acid esters having HLB values in the range of 9.6 to 10 are preferred nonionic surfactants. The preferred sorbitan fatty acid esters having HLB values in the range of 4.3 to 8.6 are available commercially under the tradename SPAN®, produced by ICI Americas. SPAN® 20, a sorbitan monolaurate, has HLB of 8.6, SPAN® 40 has HLB of 6.7, SPAN® 60, a sorbitan monostearate, has HLB 4.7, and SPAN® 80 has HLB of 4.3. SPAN® 20 is particularly preferred. Polyoxyethylene sorbitan fatty acid esters having HLB values in the range of 9.6 to 10.0 are commercially available under the tradename TWEEN®, produced by ICI Americas. Particularly preferred are TWEEN® 61, which has HLB of 9.6; and TWEEN® 81 which has HLB of 10.0.

The concentration of cosurfactant in the emulsion is 1.5 to 15, preferably 4 to 15, molecules per 100 square Angstroms of surface area of the silane particles. Higher amounts of cosurfactant are unnecessary and may lead to emulsion instability. Emulsion particle sizes cited are "intensity" weighted diameters as measured by dynamic light scattering (photon correlation spectroscopy). A NICOMP® Particle Sizer instrument was used.

The balance, up to 100%, of the aqueous silane emulsion comprises water and any optional components. Typically, the amount of water in the emulsion is 30 to 99 weight percent. The aqueous silane emulsion may further comprise one or more of the following optional components: (D) a buffer, (E) a biocide, (F) a thickener, (G) a fragrance, (H) a colorant, (I) a foaming agent, (J) an anti-foaming agent, and (K) a rust inhibitor.

Component (D) is an optional buffer used to maintain the pH of the aqueous silane emulsion in a desired range. Buffers are typically organic and inorganic acids and bases, including salts thereof. The amount of buffer added to the emulsion is typically 0.01 to 5 wt %. Suitable buffers are disclosed in U.S. Pat. No. 4,877,654, which is hereby incorporated by reference for the purpose of describing suitable buffers. When the emulsion will be used in water repellence applications, the buffer is preferably selected from the group consisting of sodium bicarbonate, sodium benzoate disodium hydrogen phosphate, and a mixture of ammonium hydroxide and acetic acid. A buffer is preferably added to the emulsion when a biocide is present, or when pH of the emulsion is outside the range of 6 to 9.

Component (E) is an optional biocide typically added in an amount of 0.1 to 5 wt % of the emulsion. Biocides are known in the art and are commercially available. For example, 6-acetoxy-2,4-dimethyl-m-dioxane (GIV-GARD DXN®) sold by Guvaudan Corp. is suitable for this invention. Suitable biocides are disclosed in U.S. Pat. No. 4,877,654, which is hereby incorporated by reference for the purpose of describing suitable biocides.

Component (F) is an optional thickener that moderately increases the viscosity of the aqueous phase. Component (F) may be used to prevent creaming of the larger particle size emulsions in this range. The thickener must not affect the stability and particle size of the emulsion. Suitable thickeners are exemplified by water soluble polymers such as polyacrylic acid and polyacrylic acid salts, alginic acid salt, alginic acid ester, polyvinyl alcohol, polyether, casein, mannan, starch, chitosan, carboxymethylcellulose, and methoxymethyl cellulose. U.S. Pat. No. 5,746,810 is hereby incorporated by reference for the purpose of describing suitable thickeners. Thickeners are typically added in an amount of 0.1 to 1 wt % of the emulsion.

Component (G) is an optional fragrance. Component (H) is an optional colorant. The colorant can be water based, or it can be an oil-soluble dye. Component (I) is an optional foaming agent. Component (J) is an optional anti-foaming agent. Component (K) is an optional rust inhibitor. Component (K) is, for example, sodium benzoate.

The emulsion of this invention can be used in a wide variety of applications, including water repellence applications. This invention further relates to a method for rendering substrates water repellent. The method comprises impregnating the substrate with the aqueous alkoxysilane emulsion, and hydrolyzing and condensing the alkoxysilane. The substrate can be wood, but is preferably masonry. 'Masonry' means any porous inorganic substrate, such as building materials. Masonry includes structural ceramics, cements, insulation products, stone, and concrete. Suitable substrates are disclosed in U.S. Pat. No. 4,877,654, hereby incorporated by reference for the purpose of describing suitable substrates. The method for impregnating the substrate with the aqueous alkoxysilane emulsion is not critical. For example, the emulsion can be applied to a surface of the substrate by brush coating, roller coating, or spraying. Alternatively, the aqueous alkoxysilane emulsion can be mixed with a composition, such as uncured concrete, and thereafter the composition can be cured to form a substrate having water repellency. The amount of emulsion impregnated in the substrate depends on the porosity and surface conditions of the substrate but is typically in the range of 0.05 to 2.0 Kg/sq m.

This invention further relates to a method for preparing the emulsion of the present invention. The method comprises:

emulsifying a composition comprising
A) water;
B) 5 to 65 wt % of at least 1 alkoxysilane, wherein the alkoxysilane forms a discontinuous phase of particles dispersed in the water; and
C) an emulsifier system consisting essentially of
  (i) a primary surfactant, wherein the primary surfactant is a nonionic emulsifier having an HLB greater than 13, and wherein the primary surfactant is present in the emulsion at a concentration of 0.5 to 3 molecules per 100 square Angstrom of surface area of the particles and
  (ii) a cosurfactant, wherein the cosurfactant is a nonionic emulsifier having an HLB less than 11, and wherein the cosurfactant is present in the emulsion at a concentration sufficient to provide 1.5 to 15 molecules per 100 square Angstroms of surface area of the particles.

The emulsion can be made with a desired particle size of the discontinuous phase (i.e., less than 0.5 micrometers) to get the correct range of surfactant coverage on the particles. Particle size can be varied by changing shearing conditions such as sonolation pressure during emulsification. For example, if the particle size and surface coverage is too large, increasing shear or increasing sonolation pressure can be performed to decrease particle size. If particle surface coverage is too low, i.e., because particle size is too small, the shearing intensity can be decreased, additional cosurfactant can be added, or both, as needed. One skilled in the art would know how to adjust particle size by changing shearing conditions.

EXAMPLES

These examples are intended to illustrate the invention to those skilled in the art and should not be interpreted as limiting the scope of the invention set forth in the claims. All percentages in these Examples are weight percentages, unless otherwise indicated. For purposes of these Examples, 'n-Otes' means n-octyltriethoxysilane and 'i-Btes' means isobutyltriethoxysilane. The nonionic surfactants used are shown by tradename in these Examples. BRIJ® 35L is a polyoxyethylene laurel ether with HLB of 16.9. TRITON® X-100 is an ethoxylated octylphenol with HLB 13.5. TRITON® X-305 is an ethoxylated octylphenol with HLB of 17.3. SPAN® 20 is a sorbitan monolaurate with HLB of 8.6. LONZEST® GMO is an ethoxylated fatty ester with HLB of 3.0.

The equation used to calculate gamma ($\Gamma$), which is number of surfactant molecules per 100 square Angstroms of particle surface area, is shown below:

$$\Gamma = \%S \times D \div (9.96 \times 10^{-3} \times M \times \%silane),$$

where S is the weight percent of the emulsifier in the emulsion, D is the initial particle size (diameter) of the silane particles in nanometers, and M is the molecular weight of the emulsifier.

Reference Example 1

An emulsion of a silane was prepared by mixing 12 parts water with the primary surfactant until the primary surfactant was completely mixed with the water. Then 40 parts of the silane were mixed with the cosurfactant and added to the above water mixture. The resulting mixture was stirred at 2000 RPM with a 1.5 inch diameter Cowls blade for 30 minutes. After 30 minutes an additional 58.3 parts water was added and the resulting mixture was processed through a 2 stage homogenizer at 7500/1500 psi. After homogenizing the mixture, 0.001 parts of sodium bicarbonate was added to the mixture to maintain a pH of approximately 7.0.

The initial particle size of the resulting emulsion was measured by a NICOMP® particle size analyzer. Particle size is reported in nanometers, unless otherwise indicated below. Based on the amount of primary surfactant added and the initial particle size, a coverage of primary surfactant per 100 square Angstroms of particle size was generated according to the formula above. Similarly, based on the amount of cosurfactant and the initial particle size, a coverage of cosurfactant per 100 square Angstroms of particle size was generated according to the formula above.

The particle size of the emulsion was measured after storage at room temperature. When a clear water layer was visually observed on the bottom of the emulsion, the emulsion was deemed to have failed stability.

Tables 1–3 show the primary surfactant and the amount used, the cosurfactant and the amount used, the silane used, and the amount of water used. Table 4 shows the coverage of primary surfactant and cosurfactant and the particle size measured over time for each sample, until the sample failed stability.

Comparative Example 1

An emulsion of N-octyltriethoxysilane was prepared by the method of Reference Example 1. The surfactants used were the same as used in the examples of U.S. Pat. No. 4,877,654 to Wilson et al. For the purposes of this experiment, TRITON® X-305 (HLB=17.3) was presumed to be the primary surfactant, and TRITON® X-100 (HLB=13.5) was presumed to be the cosurfactant. The amount of TRITON® X-305 was 0.48 parts by weight. The amount of TRITON® X-100 was 1.12 parts by weight. The resulting emulsion had an initial particle size of 402 nm. Based on the amount of TRITON® X-100 added and the initial particle size a coverage of 1.8 molecules of co-surfactant per 100 square Angstroms of particle size was generated. The emulsion increased in particle size until a particle size of 1232 nm was measured after 21 days of storage at room temperature. After 21 days a clear water layer was observed on the bottom of the emulsion and the emulsion was determined to have failed stability. The formulation for Comparative Sample 1 is in Table 1.

Comparative Example 1 shows that unstable emulsions are produced when there is insufficient coverage of cosurfactant on the particles and the cosurfactant has an HLB value greater than 11.

Comparative Example 2

The same procedure used in Reference Example 1 was used to prepare an emulsion, except that isobutyltriethoxysilane was used instead of N-octyltriethoxysilane. TRITON® X-305 was presumed to be the primary surfactant, and TRITON® X-100 was presumed to be the cosurfactant. The amount of TRITON® X-305 was 0.48 parts by weight. The amount of TRITON® X-100 was 1.12 parts by weight. The resulting emulsion had an initial particle size of 924 nm. Within 24 hrs, the emulsion particle size increased to 1918 nm. After 24 hrs, a clear water layer on the bottom of the emulsion was observed, and the emulsion was deemed to have failed stability. The formulation for Comparative Sample 2 is in Table 1.

Comparative Example 2 shows that unstable emulsions are produced when there is insufficient coverage of cosurfactant on the particles and the cosurfactant has an HLB value greater than 11.

Comparative Example 3

Comparative Sample 3 was prepared by the same method as in Reference Example 1, except that the primary surfactant was 1.4 parts BRIJ® 35L. The cosurfactant was 0.59 parts SPAN® 20. The emulsion had an initial particle size of 335 nm. Based on the particle size and the amount of SPAN® 20 used, a coverage of 1.4 molecules of co-surfactant per 100 square Angstroms of particle size was generated.

After 14 days the emulsion had a particle size of 1247 nm, and a clear water layer was observed indicating the emulsion had failed stability. The formulation of Comparative Sample 3 is in Table 2.

Comparative Example 4

Comparative Sample 4 was prepared by the same procedure as in Comparative Example 3, except that only 0.25 parts SPAN® 20 was added. The resulting emulsion had an initial particle size of 342 nm. Based on the particle size and amount of SPAN® 20 used a coverage of 0.62 molecules of co-surfactant per 100 square Angstroms of particle size was generated.

After 14 days at room temperature the emulsion had a particle size of 1619 nm. A clear water layer was observed on the bottom indicating the emulsion had failed stability. The formulation of Comparative Sample 4 is in Table 2. Comparative Examples 3 and 4 show that when the coverage of cosurfactant on the particle is insufficient, the emulsions fail stability after several weeks.

Comparative Example 5

Comparative Sample 5 was prepared by the procedure of Comparative Example 1, except that the n-octyltriethoxysilane contained 0.63 weight % of the dimer thereof as an impurity. The resulting emulsion had an initial particle size of 396 nm.

After 14 days at room temperature, the particle size was 428 nm. No separation had occurred. The formulation of Comparative Sample 5 is in Table 5, and the particle size results are in Table 6.

Comparative Example 6

Comparative Sample 6 was prepared by the procedure of Comparative Example 1, except that the n-octyltriethoxysilane contained 2.50 weight % of the dimer thereof as an impurity.

After 14 days at room temperature, the particle size was 330 nm. No separation had occurred. The formulation of Comparative Sample 6 is in Table 5, and the particle size results are in Table 6.

Comparative Example 1, the formulation and results of which are included for comparison in Tables 5 and 6, respectively, shows that when a high purity alkoxysilane (e.g., containing 0.1 wt % or less of impurities) is used without the emulsifier system of this invention, the emulsion does not have constant particle size. Comparative Examples 1, 5, and 6 show the effect of purity of the alkoxysilane on stability and particle size. In Comparative Example 1, the n-octyltriethoxysilane contained less than 0.1 weight % of impurity, and the emulsion was unstable. Particle size also increased significantly with time. Comparative Examples 1, 5, and 6 show that as impurity content of the silane increases, constancy of particle size of the emulsion also increases.

Example 1

Sample 1 was prepared by the same procedure as in Comparative Example 3, except that 1.0 parts SPAN® 20 was added. The emulsion had an initial particle size of 392 nm. Based on the initial particle size and the amount of SPAN® 20 used a coverage of 2.8 molecules of co-surfactant per 100 square Angstroms of particle size was generated.

After 63 days at room temperature the average particle size is 437 nm. No separation has occurred. The formulation for Sample 1 is in Table 2.

Example 1 shows that the emulsifier system of this invention can be used to produce stable emulsions with constant particle size.

Example 2

Sample 2 was prepared by the same procedure as in Comparative Example 3, except 2.5 parts SPAN® 20 was added. The resulting emulsion had an initial particle size of 319 nm. Based on the initial particle size and the amount of SPAN® 20 used a coverage of 5.8 molecules per 100 Angstrom of particle size was generated.

After 63 days at room temperature particle size is 324 nm. No separation has occurred. The formulation for Sample 2 is in Table 2.

Example 2 shows that using the emulsifier system of this invention yields emulsions that have particle size that does not increase by more than 10% when stored at about room temperature for 14 days. Furthermore, Examples 1 and 2 demonstrate that as the amount of co-surfactant increases, rate of particle size change decreases.

The results of Example 2 have been included in Table 6 for comparison. Example 2 and Comparative Example 6 show that the emulsifier system of this invention produces an emulsion with stability and constant particle size comparable to emulsions of alkoxysilanes having impurity contents higher than those of alkoxysilanes suitable for use in this invention. Comparative Examples 1 and 6 and Example 2 show that when a high purity silane is used, the emulsifier system of this invention must be used to produce a stable emulsion with constant particle size.

Example 3

Sample 3 was prepared by the procedure of Reference Example 1. The silane was n-octyltriethoxysilane. The primary surfactant was 1.4 parts BRIJ® 35L. The cosurfactant was 2.0 parts LONZEST® GMO. The resulting emulsion had an initial particle size of 276 nm.

After 34 days at room temperature the particle size is 279 nm. No separation has occurred. The formulation of Sample 3 is in Table 3.

Example 3 shows that using the emulsifier system of this invention yields emulsions that have particle size that does not increase by more than 10% when stored at about room temperature for 14 days. Example 3 also demonstrates that different cosurfactants can be used to produce a stable emulsion with constant particle size.

TABLE 1

|  | HLB Value | Comparative Examples | | | |
|---|---|---|---|---|---|
|  |  | Comparative | Sample 1 | Comparative | Sample 2 |
| Silane | | n-Otes | 40.00% | i-Btes | 40.00% |
| "Primary" Surfactant | 17.3 | TRITON® X-305 | 0.48% | TRITON® X-305 | 0.48% |
| "Co-Surfactant" | 13.5 | TRITON® X-100 | 1.12% | TRITON® X-100 | 1.12% |
| Water | | | 58.40% | | 58.40% |

TABLE 2

| | | Examples: Varying Amounts of Cosurfactant | | | | | | | |
|---|---|---|---|---|---|---|---|---|---|
| | HLB Value | Comparative | Sample 3 | Comparative | Sample 4 | Sample 1 | | Sample 2 | |
| Silane Primary Surfactant | 16.9 | n-Otes BRIJ® 35L | 40.00% 1.40% | n-Otes BRIJ® 35L | 40.00% 1.40% | n-Otes BRIJ® 35L | 40.00% 1.40% | n-Otes BRIJ® 35L | 40.00% 1.40% |
| Co-surfactant | 8.6 | SPAN® 20 | 0.59% | SPAN® 20 | 0.25% | SPAN® 20 | 1.00% | SPAN® 20 | 2.50% |
| Water | | | 58.01% | | 58.35% | | 57.60% | | 56.10% |

TABLE 3

| | | Example: Different Cosurfactant | |
|---|---|---|---|
| | HLB Value | Sample | |
| Silane Primary Surfactant | 16.9 | n-Octes BRIJ® 35L | 40.00% 1.40% |
| Co-surfactant | 3.0 | LONZEST® GMO | 2.00% |
| Water | | | 56.60% |

TABLE 4

| | | | | | Particle Size & Stability | | | | | | | | | |
|---|---|---|---|---|---|---|---|---|---|---|---|---|---|---|
| | Γ Primary | Γ Cosur-factant | Initial Particle Size | 24 hr Particle Size | 3 day Particle Size | 7 day Particle Size | 14 day Particle Size | 21 Day Particle Size | 28 Day Particle Size | 35 Day Particle Size | 42 Day Particle Size | 49 Day Particle Size | 56 Day Particle Size | 63 Day Particle Size |
| Comparative Sample 1 | 0.32 | 1.8 | 402 | 360 | 517 | 559 | 785.6 | 1232 | Failed | | | | | |

TABLE 4-continued

Particle Size & Stability

| | Γ Primary | Γ Cosur- factant | Initial Particle Size | 24 hr Particle Size | 3 day Particle Size | 7 day Particle Size | 14 day Particle Size | 21 Day Particle Size | 28 Day Particle Size | 35 Day Particle Size | 42 Day Particle Size | 49 Day Particle Size | 56 Day Particle Size | 63 Day Particle Size |
|---|---|---|---|---|---|---|---|---|---|---|---|---|---|---|
| Comparative Sample 2 | 0.73 | 4.2 | 924 | 1918 | 3031 | failed | | | | | | | | |
| Comparative Sample 3 | 0.71 | 1.4 | 335 | 330 | 357 | 379 | 1247 | failed | | | | | | |
| Comparative Sample 4 | 0.72 | 0.62 | 342 | 403 | 562 | 658 | 1619 | failed | | | | | | |
| Sample 1 | 0.83 | 2.8 | 392 | 386 | 402 | 424 | 435 | 447 | | 438 (36D) | 421.2 | 420 | 468 (60D) | 437 |
| Sample 2 | 1.5 | 5.8 | 319 | 316 | 329 | 311 | 331 | 327 | 328 (30D) | 322 | 313.8 | 333 | 321 | 324 |
| Sample 3 | 0.58 | 3.9 | 276 | 277.6 | 271.7 | 266.7 | 274.7 | 252 | 271 (27D) | 279 (34D) | | | | |

'NR' means not recorded.

A number in parentheses ( ) indicates the day on which the sample was tested, when it differs form the day at the first row of Table 4.

TABLE 5

Examples: Varying Amounts of Impurity

| | HLB Value | Comparative Sample 1 | | Comparative Sample 5 | | Comparative Sample 6 | |
|---|---|---|---|---|---|---|---|
| Silane | | n-Otes | 40.00% | n-Otes | 39.37% | n-Otes | 37.50% |
| Impurity Content | | Dimer | <0.1% | Dimer | 0.63% | Dimer | 2.50% |
| "Primary Surfactant" | 17.3 | TRITON ® X-305 | 0.48% | TRITON ® X-305 | 0.48% | TRITON ® X-305 | 0.48% |
| "Co-Surfactant" | 13.5 | TRITON ® X-100 | 1.12% | TRITON ® X-100 | 1.12% | TRITON ® X-100 | 1.12% |
| Water | | | 58.40% | | 58.40% | | 58.40% |

TABLE 6

Particle Size & Stability

| | Initial Particle Size | 6 day Particle Size | 14 day Particle Size | 20 day Particle Size | 84 day Particle Size |
|---|---|---|---|---|---|
| Comparative Sample 1 | 402 | 559 (7D) | 785.6 | 1232 (21D) | Failed |
| Comparative Sample 5 | 396 | 393 | 428 | 588 | Failed (28D) |
| Comparative Sample 6 | 318 | 313 | 300 | 341 | 314 |
| Sample 2 | 319 | 311 (7D) | 331 | 327 (21D) | 324 (63D) |

A number in parentheses ( ) indicates the day on which the sample was tested, when it differs from the day at the first row of Table 6.

We claim:

1. An aqueous emulsion comprising:
   A) a continuous phase comprising water;
   B) a discontinuous phase comprising at least 1 nonpolar alkoxysilane, wherein the discontinuous phase forms particles dispersed in the continuous phase; and
   C) an emulsifier system consisting essentially of
      (i) a primary surfactant, wherein the primary surfactant is a nonionic emulsifier having an HLB greater than 13, and wherein the primary surfactant is present in the emulsion at a concentration of 0.5 to 3 molecules per 100 square Angstrom of surface area of the particles; and
      (ii) a cosurfactant, wherein the cosurfactant is a nonionic emulsifier having an HLB less than 11, and wherein the cosurfactant is present in the emulsion at a concentration sufficient to provide 1.5 to 15 molecules per 100 square Angstroms of surface area of the particles; wherein the nonpolar alkoxysilane contains an impurity in an amount of 2.50 wt % or less.

2. The emulsion of claim 1, wherein the nonpolar alkoxysilane is present from 1 to 65 wt % of the emulsion.

3. The emulsion of claim 2, wherein the nonpolar alkoxysilane is present from 5 to 10 wt % of the emulsion.

4. The emulsion of claim 1, wherein the nonpolar alkoxysilane has a molecular weight of less than 1,000.

5. The emulsion of claim 1, wherein the nonpolar alkoxysilane has general formula $R_nSiR'_{4-n}$, wherein each R is independently selected from the group consisting of alkyl, halogenated alkyl, aryl, and substituted aryl groups; R' is an alkoxy group of 1 to 6 carbon atoms; and n is 1 or 2.

6. The emulsion of claim 5, wherein R is independently an alkyl group of 1 to 20 carbon atoms.

7. The emulsion of claim 6, wherein R is independently an alkyl group of 1 to 7 carbon atoms.

8. The emulsion of claim 1, wherein the amount of impurity is 0.63 wt % or less.

9. The emulsion of claim 8, wherein the amount of impurity is 0.1 wt % or less.

10. The emulsion of claim 1, wherein the primary surfactant is a nonionic emulsifier having an HLB value greater than 15.

11. The emulsion of claim 1, wherein the cosurfactant has an HLB value less than 9.

12. The emulsion of claim 1, wherein the concentration of the cosurfactant is sufficient to provide 4 to 15 molecules of cosurfactant per 100 square Angstroms of surface area of the particles.

13. The emulsion of claim 1, wherein the particles have an average diameter of less than 10 micrometers.

14. The emulsion of claim 13, wherein the average diameter is less than 1 micrometer.

15. The emulsion of claim 1, further comprising one or more optional components selected from the group consisting of (D) a buffer, (E) a biocide, (F) a thickener, (G) a fragrance, (H) a colorant, (I) a foaming agent, (J) an antifoaming agent, and (K) a rust inhibitor.

16. The emulsion of claim 15, wherein the buffer is selected from the group consisting of organic and inorganic acids and bases, and salts of organic and inorganic bases.

17. The emulsion of claim 16, wherein the biocide is present from 0.1 to 5 wt % of the emulsion.

18. The emulsion of claim 16, wherein the thickener is selected from the group consisting of polyacrylic acid and polyacrylic acid salts, alginic acid salt, alginic acid ester, polyvinyl alcohol, polyether, casein, mannan, starch, chitosan, carboxymethylcellulose, and methoxymethyl cellulose.

19. The emulsion of claim 15, wherein the colorant is selected from the group consisting of water based colorants and oil-soluble dyes.

20. The emulsion of claim 15, wherein the rust inhibitor is sodium benzoate.

21. A method for minimizing particle size increase with time of an emulsion comprising:
   I) emulsifying a composition comprising
      A) a continuous phase comprising water;
      B) a discontinuous phase comprising at least 1 alkoxysilane, wherein the discontinuous phase forms particles dispersed in the water; and
      C) an emulsifier system consisting essentially of
         (i) a primary surfactant, wherein the primary surfactant is a nonionic emulsifier having an HLB greater than 13, and wherein the primary surfactant is present in the emulsion at a concentration of 0.5 to 3 molecules per 100 square Angstrom of surface area of the particles and
         (ii) a cosurfactant, wherein the cosurfactant is a nonionic emulsifier having an HLB less than 11, and wherein the cosurfactant is present in the emulsion at a concentration sufficient to provide 1.5 to 15 molecules per 100 square Angstroms of surface area of the particles; and
   II) forming an adsorbed inner layer consisting essentially of the cosurfactant between the discontinuous phase and an outer layer consisting essentially of a combination of the primary surfactant and the cosurfactant, wherein the outer layer contacts the aqueous phase; and wherein the alkoxysilane contains an impurity in an amount of 2.50 wt % or less.

22. The method of claim 21, wherein the concentration of cosurfactant is 4 to 15 molecules per 100 square Angstroms of surface area of the silane particles, thereby minimizing size increase of the particles such that the particles do not increase in size by more than 10% after the emulsion is stored at about 25° C. for at least 14 days.

23. A water repellent composition for masonry, wherein the composition comprises an aqueous silane emulsion comprising:
   A) a continuous phase comprising water;
   B) a discontinuous phase comprising at least 1 alkylalkoxysilane having a molecular weight less than 1,000; and wherein the discontinuous phase forms particles dispersed in the continuous phase; and
   C) an emulsifier system consisting essentially of
      (i) a primary surfactant, wherein the primary surfactant is a nonionic emulsifier having an HLB greater than 13, and wherein the primary surfactant is present in the emulsion at a concentration of 0.5 to 3 molecules per 100 square Angstrom of surface area of the particles and
      (ii) a cosurfactant, wherein the cosurfactant is a nonionic emulsifier having an HLB less than 11, and wherein the cosurfactant is present in the emulsion at a concentration sufficient to provide 1.5 to 15 molecules per 100 square Angstroms of surface area of the particles; and
   D) a buffer; wherein the alkylalkoxysilane contains an impurity in an amount of 2.50 wt % or less.

24. The emulsion of claim 23, wherein the alkylalkoxysilane has general formula $R_n SiR'_{4-n}$, where R is an alkyl group of 8 to 20 carbon atoms, R' is an alkoxy group of 1 to 6 carbon atoms, and n is 1 or 2.

25. The emulsion of claim 24, wherein the alkylalkoxysilane is n-octyltriethoxysilane.

26. The emulsion of claim 23, wherein the discontinuous phase represents 40 to 60 wt % of the emulsion.

27. The emulsion of claim 23, wherein the cosurfactant is selected from the group consisting of polyhydroxy compounds and sorbitan fatty acid esters.

28. The emulsion of claim 23, wherein the buffer is selected from the group consisting of inorganic acids and salts thereof.

29. The emulsion of claim 28, wherein the buffer is selected from the group consisting of sodium bicarbonate, disodium hydrogen phosphate, and a mixture of ammonium hydroxide and acetic acid.

30. The emulsion of claim 23, further comprising a biocide.

31. The emulsion of claim 30, wherein the biocide is 6-acetxoy-2,4-dimethyl-m-dioxane.

32. The emulsion of claim 23, further comprising sodium benzoate as a rust inhibitor.

33. A method for rendering a masonry substrate water repellent comprising:
   (I) impregnating the masonry substrate with an emulsion, wherein the emulsion comprises
      A) a continuous phase comprising water;
      B) a discontinuous phase comprising at least 1 alkylalkoxysilane having a molecular weight less than 1,000; wherein the discontinuous phase represents 5 to 65 wt % of the emulsion, and wherein the discontinuous phase forms particles dispersed in the continuous phase; and
      C) an emulsifier system consisting essentially of
         (i) a primary surfactant, wherein the primary surfactant is a nonionic emulsifier having an HLB greater than 13, and wherein the primary surfactant is present in the emulsion at a concentration of 0.5 to 3 molecules per 100 square Angstrom of surface area of the particles and
         (ii) a cosurfactant, wherein the cosurfactant is a nonionic emulsifier having an HLB less than 11, and wherein the cosurfactant is present in the emulsion at a concentration sufficient to provide 1.5 to 15 molecules per 100 square Angstroms of surface area of the particles; and
      D) a buffer; and
   (II) hydrolyzing and condensing the alkoxysilane; wherein the alkoxysilane contains an impurity in an amount of 2.50 wt % or less.

* * * * *